Jan. 23, 1968  M. WENGRYN  3,364,606
SLIDE FOR DISPLAY PROJECTOR
Filed Sept. 21, 1964
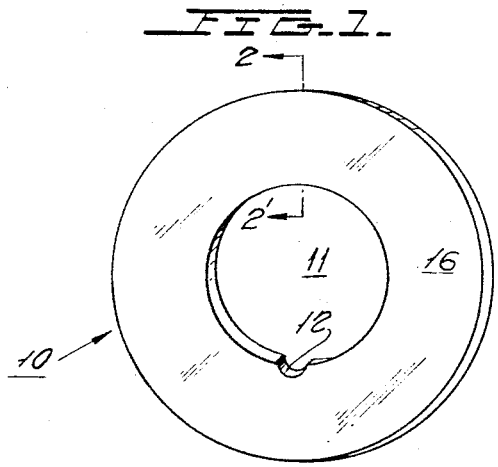
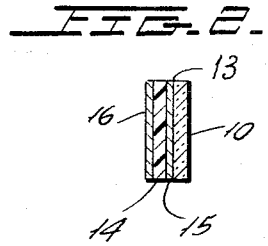
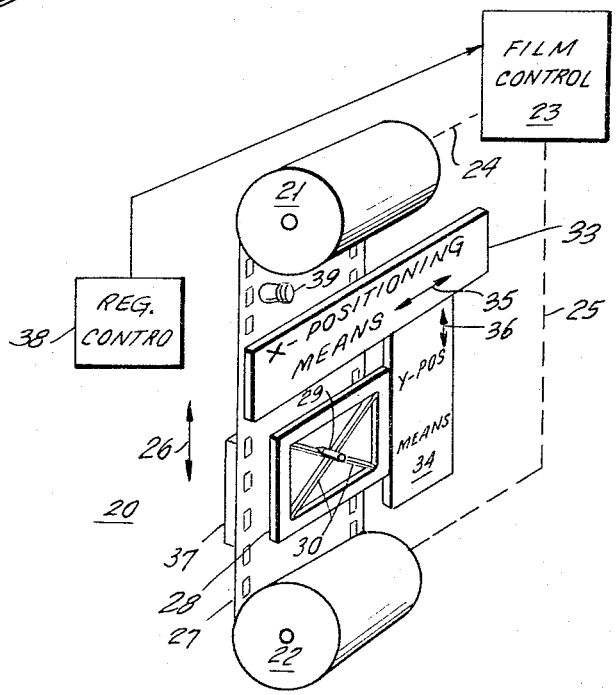
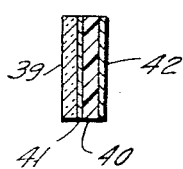
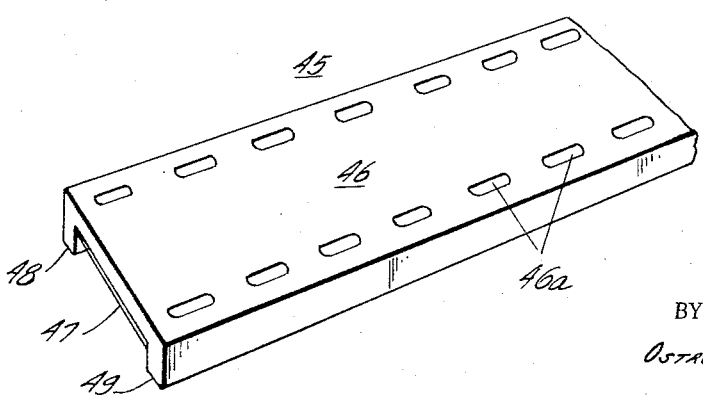
INVENTOR.
MICHAEL WENGRYN
BY
OSTROLENK, FABER, GERB & SOFFEN
ATTORNEYS

United States Patent Office 3,364,606
Patented Jan. 23, 1968

3,364,606
SLIDE FOR DISPLAY PROJECTOR
Michael Wengryn, Bellerose, N.Y., assignor to Kollsman Instrument Corporation, Elmhurst, N.Y., a corporation of New York
Filed Sept. 21, 1964, Ser. No. 397,983
4 Claims. (Cl. 40—130)

The instant invention relates to projectors and more particularly to a slide means for data projectors and the like which is so designed as to be scribed or scratched by the data projector stylus for the purpose of generating an image to be projected upon a screen wherein the slide member employs a plastic coating.

A typical data projector in which the slide means of the instant invention may be employed is described in detail in U.S. Patent No. 3,151,927, entitled Data Projector, issued October 6, 1964 to W. Angst et al.; U.S. Patent No. 3,160,462, entitled Data Projector Input Device, issued December 8, 1964 to W. Angst et al.; U.S. Patent No. 3,230,543, entitled Data Projector Slide Assembly, issued January 18, 1966 to Oscar A. Morgenstern and now abandoned; application Serial No. 195,871, entitled Data Projector Stylus Assembly, filed May 18, 1962, by W. Angst et al., all of which patents and applications are assigned to the assignee of the instant invention. In data projectors of this type one common application is that of being capable of providing a plurality of traces such as, for example, trajectories of enemy aircraft and the like upon a single screen wherein the trace from the first propector in no way affects the projection of a trace from the other projectors within the system. Such an approach requires that the background be black or opaque and that the trace be illuminated. In order to provide traces of this general type, the common approach has been to coat annular glass members with an opaque coating which is scratched by means of a stylus capable of moving in the X and Y plane in order to generate the trace or trajectory of the desired object being monitored. In order to provide a slide member which may be traced satisfactorily the annular glass slide must be coated with a plurality of layers of different material, the compositions of which and thickness of which must be carefully controlled, thereby requiring a tedious and exacting process in the fabrication thereof.

In the instant invention the fabrication of the slide means is greatly simplified by the use of a plastic element as a primary component of the slide means.

In one preferred embodiment of the instant invention a suitable plastic material such as, for example, a polyethylene terephthalate film is employed. This film is presently available commercially and is identified with the trademark Mylar. It should be understood that any other film of similar suitable characteristics may be employed. The film is then coated with opaque ink and the uncoated side is then adhered to the annular glass slide by a suitable adhesive material which is satisfactory to maintain the dimensional stability of the film during a scratching or scribing operation by the data projector stylus.

As another means for holding the Mylar film, the annular glass slide may be formed of a transparent material which is hollow and which is provided with small holes on the inside face of the slide against which the Mylar film is positioned. By providing a suction, the Mylar film may be held against the holes provided in the annular glass slide. Electrostatic holding techniques might also be employed. The composite annular slide means may then be scribed or scratched in the same manner as is described in detail in U.S. Patent No. 3,151,927, entitled Data Projector, mentioned above. This is done by positioning the ink coated side of the film toward the stylus member to facilitate the scribing operation.

As another alternative embodiment, the Mylar film may be provided in the same form as that employed in motion picture projectors and which is fed by a take-up and a feed reel or spool. The film is fed in a direction transverse to the stylus of the data projector and is provided with an ink coating which is scratched or scribed by the data projector stylus for generation of the trace to be projected. A transparent member such as, for example, glass is positioned adjacent the opposite side of the film strip and acts as a bearing surface for the scribing stylus. The take-up and feed reels may also be provided with suitable tensioning means to further enhance the dimensional stability of the film strip.

In applications where it is desirable to return to a previously scribed location upon the film strip in order to generate one or more additional traces, registration means are provided in order to place the original trace and the additional trace, or traces, in their proper dimensional relationships, thereby insuring proper positioning of a previously scribed indication upon the film strip.

In cases where it becomes significant to prevent scratching or marring of the coated side of the film strip when it is rolled upon either the take-up or feed reels, raised edges are provided along the sides of the uncoated film strip surface so as to retain adjacent portions of the film strip in spaced relationship when the film strip is rolled upon either the take-up or feed reels.

Still another preferred embodiment of the instant invention is that of employing ribbon glass which is a thin substantially narrow strip of flexible material having extremely good transparency characteristics. One surface of the ribbon glas may be coated with an opaque ink or may be adhered to by the ink coated Mylar film by means of a suitable adhesive. Such a ribbon glass strip may be fed by feed and take-up reels in the same manner as previously described and can be further provided with a glass member for use as a bearing surface.

It is therefore one object of the instant invention to provide novel slide means for use in data projectors and the like.

Another object of the instant invention is to provide novel slide means for use in data projectors and the like employing a plastic film member.

Another object of the instant invention is to provide novel slide means for use in data projectors and the like employing a plastic film member having an opaque ink coating provided thereon.

Still another object of the instant invention is to provide a novel slide means for use in data projector systems and the like comprising a polyethylene terephthalate film as one primary component thereof.

Still another object of the instant invention is to provide a novel slide means for use in data projector systems and the like comprising a polyethylene terephthalate film as one primary component thereof wherein the film is coated with an opaque ink.

Still another object of the instant invention is to provide a novel slide means for use in data projector systems and the like comprising a polyethylene terephthalate film as one primary component thereof wherein the film is coated with an opaque ink and adhered to a glass slide member.

Another object of the instant invention is to provide novel slide means for use in data projectors and the like comprised of plastic film strip means having an ink coating for scribing by a data projector stylus.

Still another object of the instant invention is to provide novel slide means for use in data projectors and the like comprised of a film strip having an opaque coating to be scribed by the data projector stylus.

Still another object of the instant invention is to provide novel slide means for use in data projectors and the like comprised of a film strip having an opaque coating to be scribed by the data projector stylus wherein the film strip is formed of ribbon glass coated with an opaque ink.

Still another object of the instant invention is to provide novel slide means for use in data projectors and the like comprised of a film strip having an opaque coating to be scribed by the data projector stylus wherein the film strip is ribbon glass having an ink coated Mylar strip adhesively applied thereto.

Still another object of the instant invention is to provide novel slide means for use in data projectors and the like comprised of a film strip having an opaque coating to be scribed by the data projector stylus wherein the film strip is a polyethylene terephthalate film having an opaque ink coating.

These and other objects of the instant invention will become apparent when reading the accompanying description and drawings in which:

FIGURE 1 shows an annular glass slide of the type employed in data projectors.

FIGURE 2 is a cross-section taken along the line 2—2' of FIGURE 1, showing the makeup of the glass slide.

FIGURE 3 is a perspective drawing showing an alternative embodiment of the instant invention.

FIGURE 3a shows a cross section of the film strip of FIGURE 3.

FIGURE 3b shows an alternative cross-section of the film strip of FIGURE 3.

FIGURE 4 is a perspective view of still another alternative embodiment of the instant invention.

Making reference to the drawings, FIGURE 1 shows an annular glass slide which is designed in accordance with the principles of the instant invention and which may be employed in data projector systems of the type described in U.S. Patent No. 3,151,927, mentioned previously. The slide member 10 has a generally annular shape and is provided with a central opening 11. A suitable notch 12 is provided along the periphery of the opening 11 and serves the purpose of registering the annular slide 10 relative to the data projector, as is described in U.S. Patent No. 3,151,927. An annular glass slide 10 is provided with one surface 13 having a Mylar film 14 (see FIGURE 2) secured thereto by means of an adhesive 15. Any adhesive which will provide good adherence between the elements 10 and 14 so as to retain the Mylar film 14 dimensionally stable may be employed. Any transparent, thin, uniformly applied adhesive will provide extremely satisfactory results. The exposed surface of the Mylar film 14 is coated with an opaque ink 16, as shown in FIGURE 2, so as to generally prevent the passage of light therethrough. The ink 16 may be relatively freely scribed or scratched, by the data projector stylus in the manner taught by U.S. Patent No. 3,151,927. The ink employed must be relatively stable while at the same time must be relatively easy to scribe or scratch by the data projector stylus. One typical ink which may be employed is textile marking ink. Also carbon black has yielded excellent results. It should be understood that any suitable material may be substituted, however.

FIGURE 3 shows an alternative embodiment 20 of the instant invention which is comprised of a plastic film prepared in strip form so as to facilitate its being fed by the feed and take-up reels or spools 21 and 22, respectively. Reels 21 and 22 are mechanically coupled to film control means 23 with these linkages being detected by the dash lines 24 and 25, respectively. This may be any suitable drive means such as, servo means, which may be of the same general type as that employed to position the annular slide means 10, as described in U.S. Patent No. 3,151,927. The plastic film strip 27 is fed transversely, as shown by the double-headed arrow means 26 relative to the stylus frame 28 which has the stylus 29 secured thereto in the same manner as described in copending application by the cross-hair members 30.

Upon the appropriate command the plastic strip 27 is fed one frame position at a time so that the next frame to be scribed is positioned immediately in front of the stylus 29. The plastic strip 27 is also shown in FIGURE 3a and is comprised of a plastic base 31 such as, for example, Mylar, having an opaque ink coating 32 facing in the direction of the stylus 29.

In order to perform the scribing operation the stylus is moved into contact with the opaque coating 32 by means fully described in U.S. Patent No. 3,151,927, and then is controlled by the X and Y positioning means 33 and 34, respectively, to provide the stylus 29 with a full range of motion in the plane of the plastic film strip surface. The operation is such that the Y positioning means 34 controls the stylus frame 28 to move either upwardly or downwardly, as shown by the double-headed arrow 36. The Y positioning means 34 is in turn secured to the X positioning means 33 which controls the Y positioning means and hence the stylus frame and stylus 28 and 29, respectively, to move in the horizontal direction, as shown by the double-headed arrow 35. Thus, upon the receipt of the appropriate analog type signals the stylus 29 may be operated to trace any shape curve or figure upon the opaque surface of the plastic film strip 27.

In order to provide a suitable bearing surface for the scribing stylus 29 a transparent member such as, for example, glass 37, is positioned adjacent the opposite side of the plastic strip 27 to facilitate the scribing operation. The feed and take-up reels 21 and 22 are suitably tensioned to provide further dimensional stability for the plastic strip 27.

In instances where a frame which has previously been scribed or traced, is again repositioned adjacent the stylus 29 for an additional scribing operation or additional scribing operations, the registration control means 38 is provided. A suitable light source 39 is positioned along one side of the plastic strip 27 and will pass light through the sprocket-like openings 27a in film strip 27, which light beams are picked up by suitable photoelectric means provided in the registration control means 38 which, in turn, operates the film control means 23 in order to insure the fact that the frame portion of the plastic strip 27 is again positioned before the stylus frame 28 in substantially the identical position which it occupied during the course of its first scribing operation. The registration control means 38 may also be employed for the purpose of controlling the advance of the plastic strip 27 on a frame by frame basis and also may be employed to provide the control where it is desired to skip one or a plurality of frames. It should be understood that the sprocket like holes, or openings, 27a shown in the film strip 27 should be extremely narrow slits and be spaced relatively close to one another in order to provide extremely accurate control to pinpoint the repositioning of the film strip. As a still further embodiment, the openings or slits may be substituted by a track or plurality of tracks of magnetic patterns, for example, each of which cooperate with a read head to develop a binary code which may be read out and interpreted as a physical position for the tape means.

As an alternative embodiment to the plastic strip composition shown in FIGURE 3a which is comprised of a Mylar base 31 having an opaque ink coating 32, the Mylar strip 31 may be substituted by a ribbon glass strip which also provides suitable results when used in the system of FIGURE 3.

As still another alternative embodiment, the plastic strip may be comprised of a ribbon glass base 39 secured to film strip 40 by suitable adhesive means 41. The Mylar film strip 40 is then provided with an opaque ink coating 42 in the same manner as previously described. In the description of the wide compositions as depicted in FIGURES 2, 3a and 3b, it should be understood that the thicknesses of the individual layers for each embodiment as shown therein have been greatly exaggerated for descriptive purposes only and the thicknesses of each element and relative thicknesses as between elements or layers should in no way be construed to represent the actual relationships between these separate layers.

It can be seen from the foregoing that the instant invention provides a novel slide composition for use in data projectors and the like employing a plastic film having an opaque coating for scribing purposes which may either be employed in a film strip arrangement or may be adhered to a glass slide. In any of the above embodiments the employment of the plastic film provides exceptionally good results and further avoids the tedious and exacting problems involved in glass slide members provided in the prior art.

In instances where the scratching or marring of the opaque coated surface may constitute a worrisome problem, the embodiment of FIGURE 4 may be employed. FIGURE 4 shows a plastic strip arrangement 45 comprised of a plastic strip 46 formed of either ribbon glass or Mylar having sprocket holes 46a being of the same type and providing the same function as the sprocket type holes 27a previously described. It should also be understood that the sprocket holes can be employed for the actual feeding of the tape as well as for use in cooperation with the registration control means 38 shown in FIGURE 3.

The underside of the plastic strip 46 is provided with an opaque coating 47 in the same manner as previously described. This underside is still further provided with raised edges 48 and 49 which may be formed, for example, from two fairly narrow strips of the same plastic material as the strip 46 and which act to retain the opaque coating 47 in spaced relationship from the adjacent layer of the plastic film when the film strip is held upon either the take-up or feed reel 22 or 21, respectively, as shown in FIGURE 3. This embodiment thereby provides the additional protection of the opaque coating both before and after the scribing operation has been performed and thereby insures extremely long useful operating lives for slide compositions of this type, whether they be in the unscribed or scribed condition.

Although there has been described a preferred embodiment of this novel invention, many variations and modifications will now be apparent to those skilled in the art. Therefore, this invention is to be limited, not by the specific disclosure herein, but only by the appending claims.

The embodiments of the invention in which an exclusive privilege or property is claimed are defined as follows:

1. Slide means for use in data projectors having a scribing stylus comprising an annular glass slide, a plastic film, adhesive means securing said plastic film to one surface of said annular glass slide; and an opaque coating being provided on the exposed surface of said plastic film, said plastic film being a polyethylene terephthalate film, said opaque coating being a marking ink; said adhesive being transparent; whereby said opaque coating may be scribed from the plastic film by the stylus.

2. In combination, a data projector having a scribing stylus, a transparent bearing surface, and a light source for projecting light through said transparent bearing surface and for projecting images scribed on plastic film positioned adjacent said transparent bearing surface, wherein the image is simultaneously scribed and projected;

and a plastic film strip coated on at least one surface with an opaque ink which may be removed by said stylus; said strip having a length many times greater than its width;

a plastic film strip feed reel and a take-up reel; said strip passing from said feed reel to said take-up reel;

said transparent bearing surface being positioned to support said strip when said opaque ink is being removed by said stylus.

3. The slide means of claim 2 in which said plastic film strip is a polyethylene terephthalate film.

4. The slide means of claim 3 wherein the opaque coating is carbon black.

References Cited

UNITED STATES PATENTS

| | | | |
|---|---|---|---|
| 2,234,427 | 3/1941 | Cox | 40—64 |
| 2,533,474 | 12/1950 | Koch | 40—158 |
| 2,643,577 | 6/1953 | Williams | 40—64 |
| 2,832,163 | 4/1958 | Jost | 40—158 |
| 3,070,915 | 1/1963 | Waltec | 40—158 |
| 3,076,279 | 2/1963 | Afton | 40—158 |
| 3,089,270 | 5/1963 | Shoemaker | 40—158 |
| 3,224,130 | 12/1965 | Seigh | 40—158 |
| 2,141,964 | 12/1938 | Yonkers | 346—77 |
| 2,859,659 | 11/1958 | Fenske et al. | 346—77 |
| 3,230,543 | 1/1966 | Morgenstern | 346—77 |

FOREIGN PATENTS

| | | |
|---|---|---|
| 10,486 | 5/1913 | Great Britain. |
| 192,144 | 1/1923 | Great Britain. |

EUGENE R. CAPOZIO, *Primary Examiner.*

W. J. CONTRERAS, *Examiner.*